United States Patent
Takamura (10) Patent No.: US 9,235,523 B2
(45) Date of Patent: Jan. 12, 2016

(54) DATA PROCESSING APPARATUS AND CONTROL METHOD THEREOF

(71) Applicant: CANON KABUSHIKI KAISHA, Tokyo (JP)

(72) Inventor: Akihiro Takamura, Kokubunji (JP)

(73) Assignee: CANON KABUSHIKI KAISHA, Tokyo (JP)

(*) Notice: Subject to any disclaimer, the term of this patent is extended or adjusted under 35 U.S.C. 154(b) by 106 days.

(21) Appl. No.: 14/093,965

(22) Filed: Dec. 2, 2013

(65) Prior Publication Data

US 2014/0164712 A1  Jun. 12, 2014

(30) Foreign Application Priority Data

Dec. 10, 2012  (JP) .................................. 2012-269786

(51) Int. Cl.
*G06F 13/12*  (2006.01)
*G06F 12/08*  (2006.01)
*G06F 12/12*  (2006.01)

(52) U.S. Cl.
CPC .......... *G06F 12/0862* (2013.01); *G06F 12/126* (2013.01)

(58) Field of Classification Search
CPC .......................... G06F 12/0862; G06F 12/0897

USPC ............................................................ 710/62
See application file for complete search history.

(56) References Cited

U.S. PATENT DOCUMENTS

| 5,537,573 | A  | * | 7/1996  | Ware et al. ..................... 711/137 |
| 5,566,324 | A  | * | 10/1996 | Kass .............................. 711/160 |
| 7,493,451 | B2 | * | 2/2009  | Kadambi et al. .............. 711/137 |
| 8,166,251 | B2 | * | 4/2012  | Luttrell ......................... 711/137 |
| 2010/0268894 | A1 | * | 10/2010 | Kadambi et al. .............. 711/137 |
| 2012/0317351 | A1 |   | 12/2012 | Nishioka et al. |

FOREIGN PATENT DOCUMENTS

JP  10-320285 A  12/1998

* cited by examiner

*Primary Examiner* — Titus Wong
(74) *Attorney, Agent, or Firm* — Fitzpatrick, Cella, Harper & Scinto (57) ABSTRACT

A cache memory device includes a data array structure including a plurality of entries identified by indices and including, for each entry, data acquired by a fetch operation or prefetch operation and a reference count associated with the data. The reference count holds a value obtained by subtracting a count at which the entry has been referred to by the fetch operation, from a count at which the entry has been referred to by the prefetch operation. As for an entry created by the prefetch operation, a prefetch device inhibits replacement of the entry until the value of the reference count of the entry becomes 0.

9 Claims, 6 Drawing Sheets

DATA PROCESSING APPARATUS AND CONTROL METHOD THEREOF

BACKGROUND OF THE INVENTION

1. Field of the Invention

The present invention relates to a data processing apparatus and control method thereof.

2. Description of the Related Art

Recent improvement of the degree of semiconductor integration has speeded up a processor and a DRAM often used as a main memory, but the DRAM speed is less increased than the processor speed. To cancel the gap between these speeds, a small-capacity high-speed cache memory is interposed between the high-speed processor and the low-speed main memory.

In most cases, the contents of the main memory are copied to the cache memory only at the time of memory access. However, this method delays processing by the memory latency (time taken to access the memory), decreasing the speed. To hide the memory latency, cache prefetch is performed to copy the contents of the main memory to the cache memory in advance for an address range to be used.

The memory latency can be hidden by performing prefetch as early as possible before fetch for actually performing processing. However, if prefetch is excessively early, data which is prefetched and will be used in the future may be replaced with data to be prefetched.

To solve this problem, in Japanese Patent Laid-Open No. 10-320285, a lock bit is set when storing prefetch data, not to replace prefetched data before read. The lock is released when reading out the locked data. This prevents replacement of data which has been fetched but has not been used even once.

However, in the technique disclosed in Japanese Patent Laid-Open No. 10-320285, when data is used once, the lock is released and the data is subjected to replacement. Even data which is used twice or more after prefetch may be replaced with subsequently prefetched data.

SUMMARY OF THE INVENTION

The present invention provides an arrangement which suppresses excessive data replacement by prefetch.

According to one aspect of the present invention, there is provided a data processing apparatus comprising: a cache memory unit configured to store some of data in a main memory; a fetch unit configured to perform a fetch operation for data from the main memory to the cache memory unit; and a prefetch unit configured to perform, independently of the fetch operation, a prefetch operation including processing of reading out data from the main memory and replacing, with the readout data, at least some of the data stored in the cache memory unit by the fetch operation, wherein the cache memory unit includes a data array structure including a plurality of entries identified by indices and including, for each entry, data acquired by one of the fetch operation and the prefetch operation and a reference count associated with the data, the reference count indicates a value obtained by subtracting a count at which the entry has been referred to by the fetch operation, from a count at which the entry has been referred to by the prefetch operation, and as for an entry created by the prefetch operation, the prefetch unit inhibits replacement of the entry until a value of the reference count of the entry becomes 0.

Further features of the present invention will become apparent from the following description of exemplary embodiments (with reference to the attached drawings).

DESCRIPTION OF THE EMBODIMENTS

Various exemplary embodiments, features, and aspects of the invention will be described in detail below with reference to the drawings.

A preferred embodiment of the present invention will now be described with reference to the accompanying drawings. The following embodiment is not intended to limit the present invention and is merely an example advantageous for practicing the invention. Also, not all combinations of features described in the embodiment are indispensable for the means to solve the problems according to the present invention.

Figure 2:
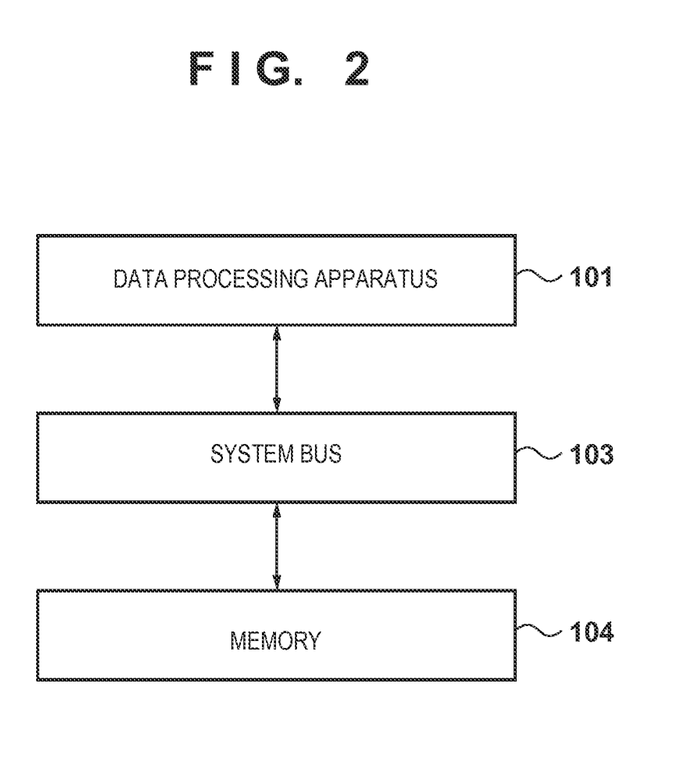
FIG. 2 is a block diagram showing the overall arrangement of a computer system according to the embodiment.

FIG. 2 is a block diagram showing the overall arrangement of a computer system according to the embodiment. The computer system according to the embodiment includes a data processing apparatus 101, a memory 104 serving as a main memory, and a system bus 103 which connects them.

Figure 1:
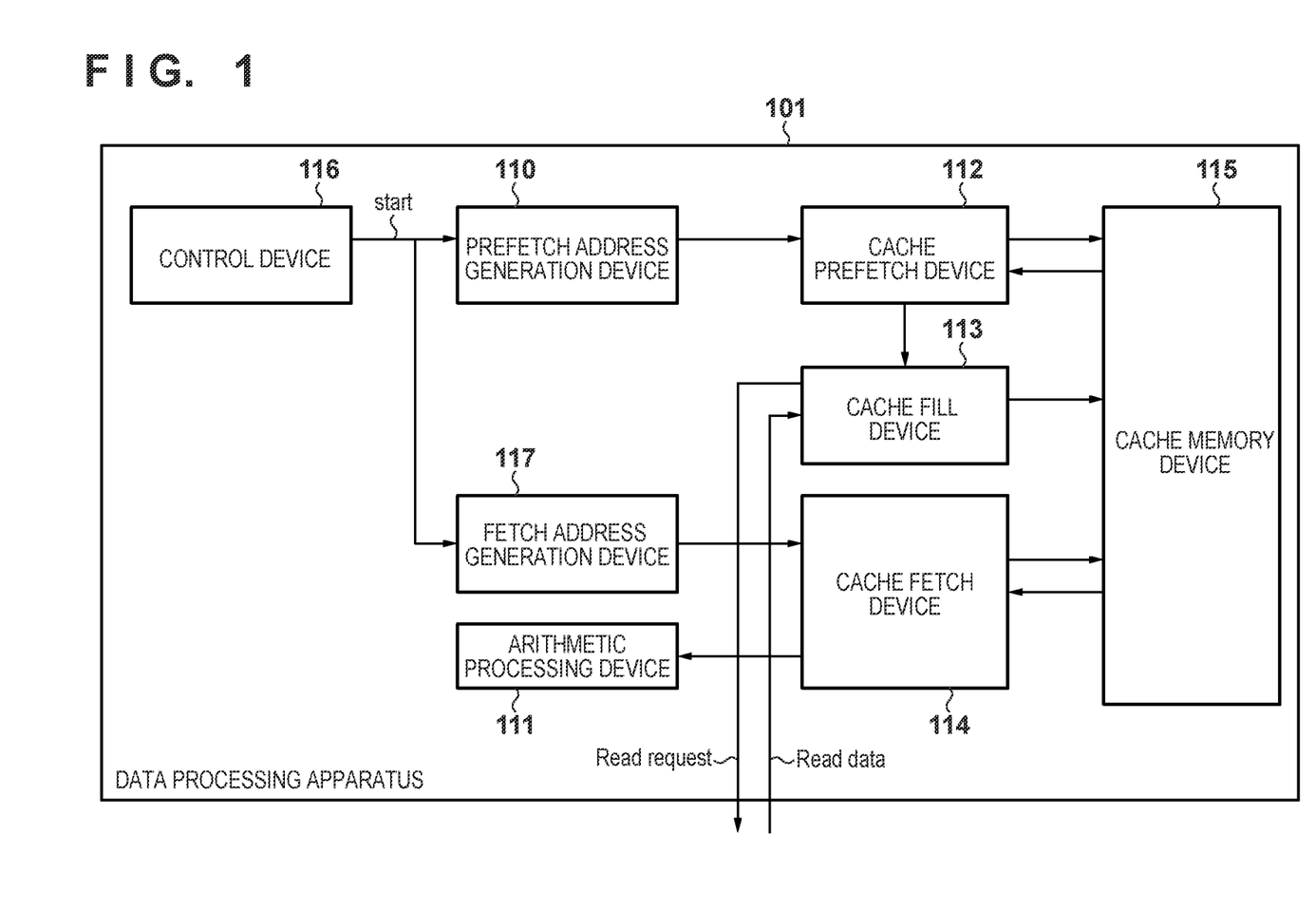
FIG. 1 is a block diagram showing the arrangement of a data processing apparatus according to an embodiment.

FIG. 1 shows the arrangement of the data processing apparatus 101. The data processing apparatus 101 generates the address of data necessary for calculation and performs arithmetic processing by using data read out from the memory 104. The data processing apparatus 101 includes a prefetch address generation device 110, arithmetic processing device 111, cache prefetch device 112, and cache fill device 113. The data processing apparatus 101 further includes a cache fetch device 114, cache memory device 115, control device 116, and fetch address generation device 117. The cache memory device 115 caches some of data in the memory 104 and is capable of data read/write at a higher speed than the memory 104. The cache fetch device 114 performs an operation to fetch data (including an instruction code) from the memory 104 to the cache memory device 115. To hide the latency of the memory 104, the cache prefetch device 112 performs, independently of the fetch operation, a prefetch operation of copying in advance some of data in the memory 104 to the cache memory device 115 for an address range to be used. The prefetch operation is accompanied by processing of replacing, with data read out from the memory 104, at least some of data stored in the cache memory device 115 by the fetch operation.

Figure 3:
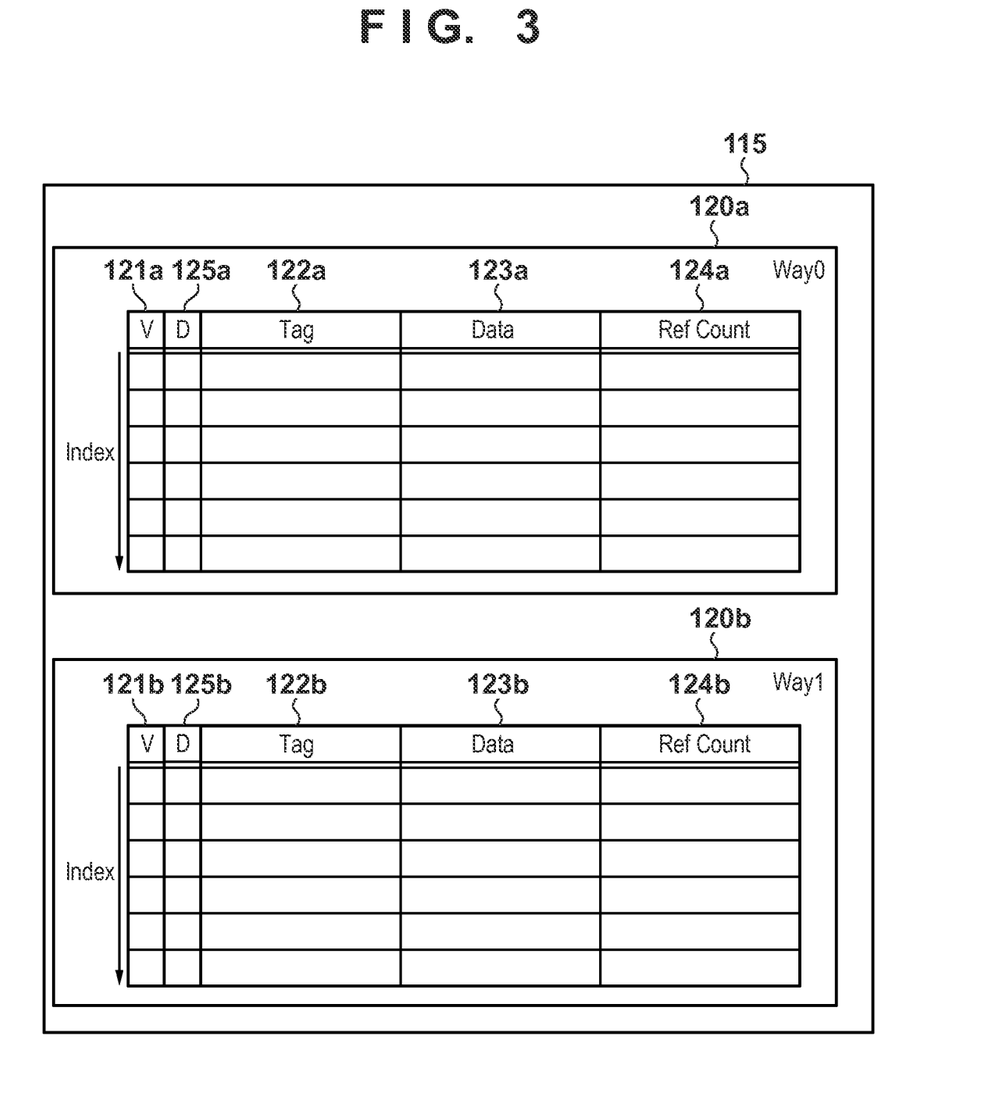
FIG. 3 is a view exemplifying the structure of a cache block stored in a cache memory device according to the embodiment.

FIG. 3 shows the data array structure of a cache block in the cache memory device 115. The cache memory device 115 has two ways, that is, Way0 120a and Way1 120b. Each way has a data array structure with a plurality of entries identified by indices. Each entry includes at least data acquired by the fetch operation or prefetch operation, and a reference count associated with the data. In the embodiment, each entry in Way0 is formed from an entry valid bit 121a (Valid bit), data valid bit 125a, tag bit 122a (Tag bit), data 123a (Data), and reference count 124a (RefCount). Similarly, each entry in Way1 is formed from an entry valid bit 121b (Valid bit), data valid bit 125b, tag bit 122b (Tag), data 123b (Data), and reference count 124b (RefCount). Data can be read out/written from/in each entry by designating a way and index (Index).

The entry valid bit 121a represents that the data valid bit 125a, tag bit 122a, and reference count 124a of this entry are valid. The data valid bit 125a represents that the data 123a stored in this entry is valid. In the embodiment, when both the entry valid bit and data valid bit are 1, this means that there is valid data. When the data valid bit is 0, this means that there is no valid data. The data valid bit is 0 in the initial state. Before performing the next processing after the end of a series of processes, the data valid bit is initialized to 0. The tag bit 122a indicates the address of the data 123a in the memory 104. The data 123a is a copy of data at an address indicated by the tag bit 122a in the memory 104. The reference count 124a holds a value obtained by subtracting a count at which an entry has been referred to by the fetch operation, from a count at which the entry has been referred to by the prefetch operation. When the reference count 124a is larger than 0, this means that the entry has data to be referred to by the fetch operation.

Note that the present invention is not limited to a specific number of ways and a specific correspondence between the cache block and the reference counter. For example, as for the number of ways, the present invention may have the above-described data array structure for two or more ways.

Next, the operation of the data processing apparatus 101 in the embodiment will be explained. In the data processing apparatus 101, the control device 116 asserts the Start signal (FIG. 1). When the Start signal is asserted, the prefetch address generation device 110 and fetch address generation device 117 start operating. After the prefetch address generation device 110 and fetch address generation device 117 start operating, they generate addresses to be referred to in the same sequence.

Figure 4:
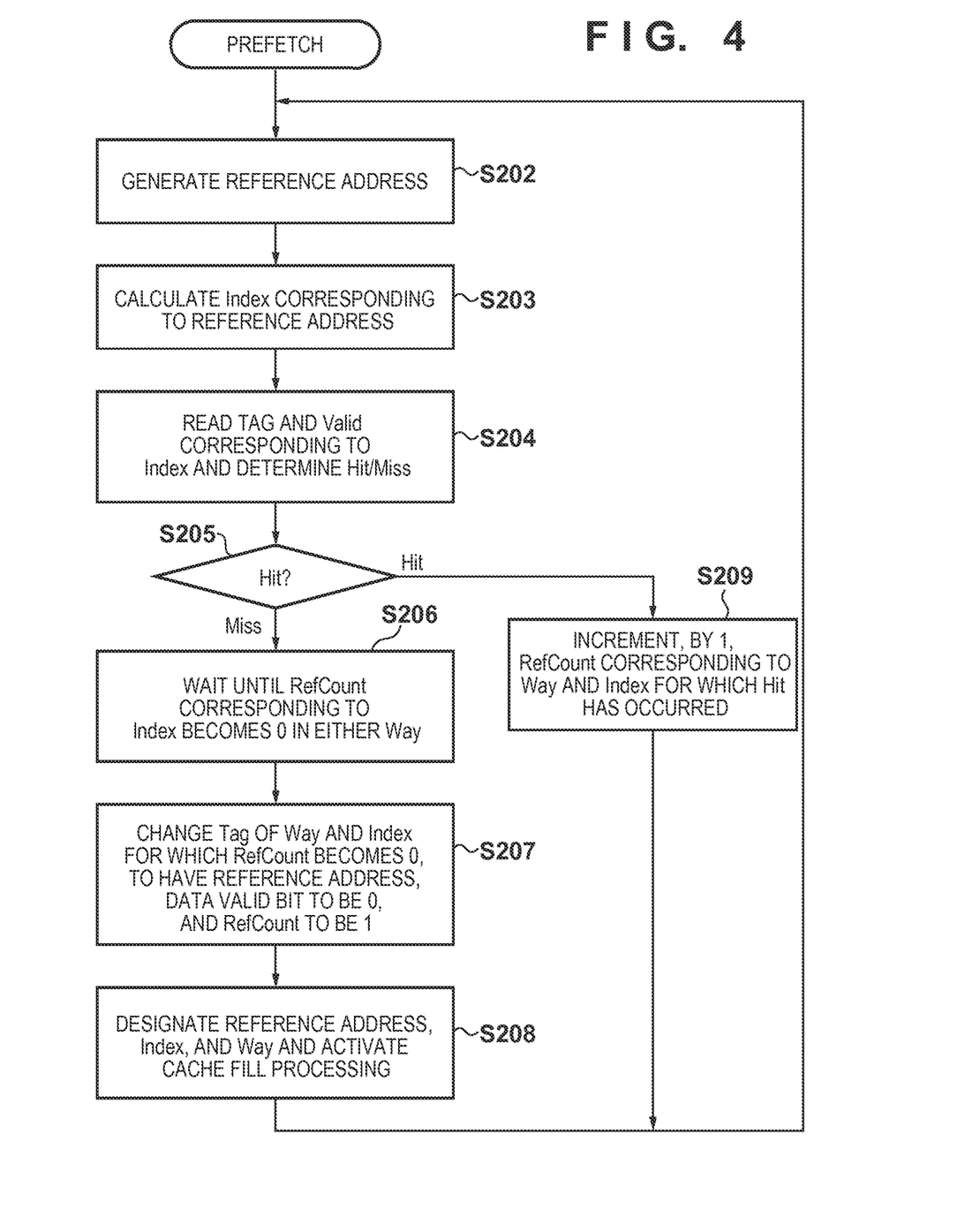
FIG. 4 is a flowchart showing prefetch processing according to the embodiment.

FIG. 4 shows a processing sequence when the prefetch address generation device 110 generates a prefetch address. The prefetch address generation device 110 generates a reference address (step S202). Upon receiving this reference address, the cache prefetch device 112 executes a series of processes in steps S203 to S209. In step S203, an index in the cache memory device 115 that corresponds to the reference address is calculated. For example, a remainder obtained by dividing the reference address by (number of entries/number of ways) is used as the index. In step S204, the entry valid bit and tag bit of an entry corresponding to the index are read out from each way in the cache memory device 115. If the entry valid bit is 1 in each way and the tag bit matches the reference address, it is determined that a way hit (Way Hit) has occurred; otherwise, it is determined that a way miss (Way Miss) has occurred. If a way hit occurs in either way, it is determined that a hit has occurred; otherwise, it is determined that a miss has occurred. If it is determined in step S205 that a hit has occurred, processing in step S209 (to be described later) is performed; if it is determined in a miss has occurred, cache replacement processing in steps S206 to S208 (to be described later) is performed. In step S206, the process waits until the value of the reference count for the index calculated in either way becomes 0.

For an entry created by the prefetch operation, it is inhibited to replace the entry by the fetch operation. In step S207, the contents of either one of the way and index for which the reference count has become 0 are updated to change the tag to have the reference address, the data valid bit to be 0, and the reference count to be 1. In step S208, the reference address, way, and index are designated to activate cache fill processing. If it is determined in step S205 that a hit has occurred, the reference count corresponding to the way and index for which the hit has occurred is incremented by one, and the count of reference by prefetch is incremented by one in step S209.

Figure 5:
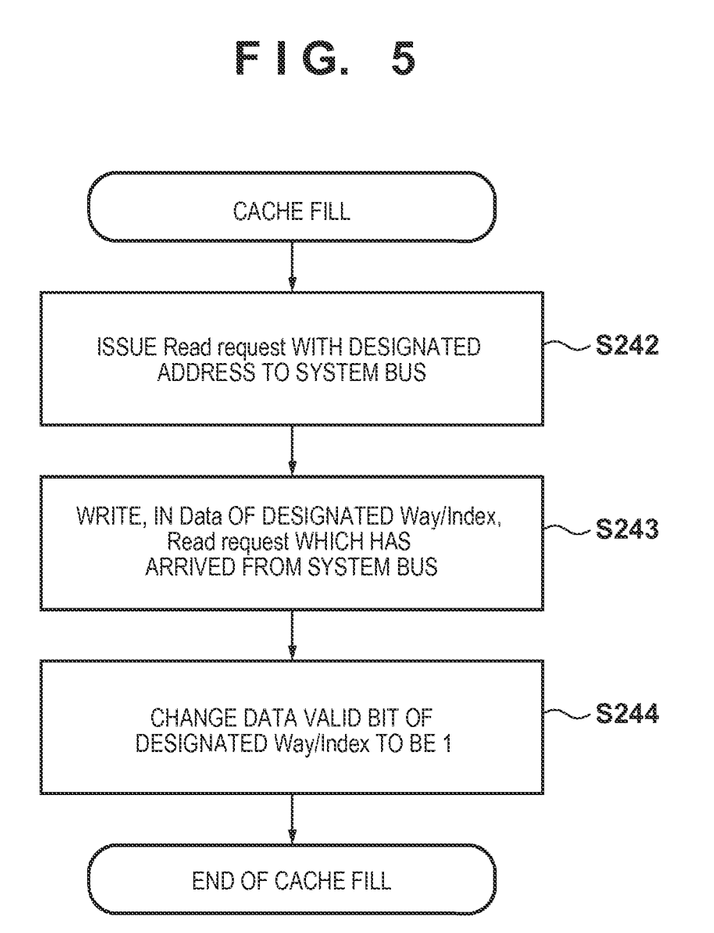
FIG. 5 is a flowchart showing cache fill processing according to the embodiment.

FIG. 5 shows a cache fill processing sequence. The cache fill device 113 issues a read request with a designated address to the system bus 103 (step S242). The read request uses a Read Request signal (FIG. 1). If data regarding read arrives via a Read Data signal, the data is stored in data (Data) indicated by a way and index designated in the cache memory device 115 (step S243). After the end of the storage, a data valid bit indicated by the way and index designated in the cache memory device 115 is changed to be 1 (step S244).

Figure 6:
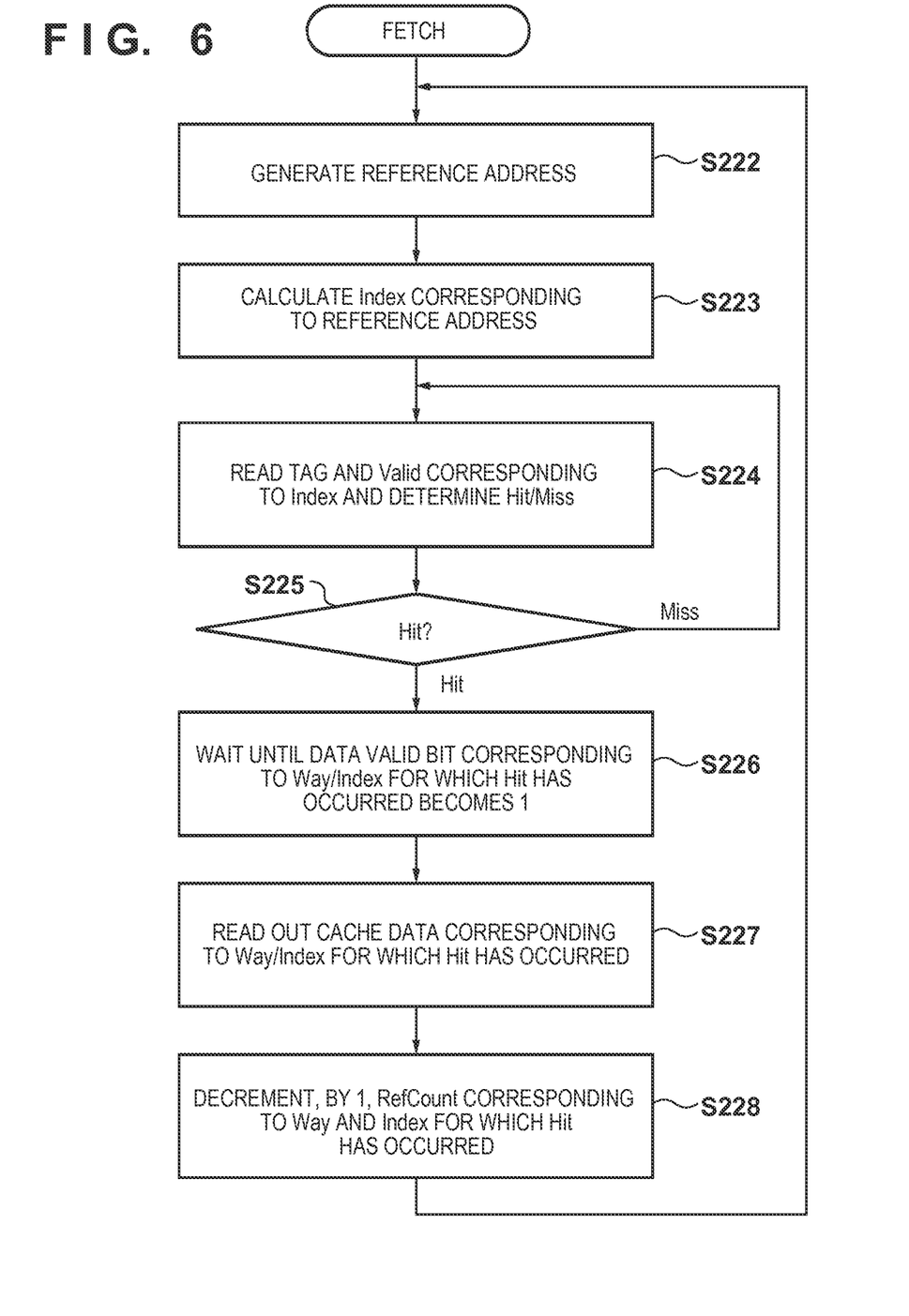
FIG. 6 is a flowchart showing fetch processing according to the embodiment.

FIG. 6 shows a processing sequence when the fetch address generation device 117 generates a fetch address. The fetch address generation device 117 generates a reference address (step S222). Upon receiving this reference address, the cache fetch device 114 executes a series of processes in steps S223 to S228. In step S223, an index in the cache memory device 115 that corresponds to the reference address is calculated. In step S224, hit/miss determination is performed, similar to step S204. If it is determined in step S225 that a miss has occurred, the process waits until the result of determination in step S224 becomes a hit. If it is determined in step S225 that a hit has occurred, the process waits in step S226 until a data valid bit corresponding to the way and index for which the hit has occurred becomes 1. In step S227, data corresponding to the way and index for which the hit has occurred is read out and output to the arithmetic processing device 111. In step S228, the reference count corresponding to the way and index for which the hit has occurred is decremented by one, and the reference count is decremented by the count of reference by fetch.

As described above, according to the embodiment, the difference between the count of reference by prefetch and that of reference by fetch is generated in the reference count, and after the reference count becomes 0, replacement is performed. This can prevent replacement of prefetched data before it is used by fetch. As a result, prefetch can be performed as early as possible, so the cache capacity for hiding the memory latency by prefetch can be reduced. Also, performance variations can be reduced.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-269786, filed Dec. 10, 2012, which is hereby incorporated by reference herein in its entirety.

What is claimed is:

1. A data processing apparatus comprising:
an acquisition unit configured to acquire instructions for operation processing;
a cache memory configured to store some of data in a main memory and capable of data read/write at a higher speed than the main memory;
a prefetch unit configured to perform control to readout data referenced for performing the operation processing according to the instructions acquired by the acquisition unit from the main memory and to cause the cache memory to store the data in a case where the data referenced for performing the operation processing according to the instructions acquired by the acquisition unit and stored in the main memory is not stored in the cache memory, and to increment a count which is stored in the cache memory and is related to a number of times the data stored in the cache memory is referenced for the operation processing according to the instructions acquired by the acquisition unit in a case where the data referenced for performing the operation processing according to the instructions acquired by the acquisition unit and stored in the main memory is stored in the cache memory,
a fetch unit configured to, independently of controlling of the prefetch unit, readout from the main memory the data referenced for the operation processing according to the instructions acquired by the acquisition unit, and according to the readout, decrement the count value which is stored in the cache memory and is related to the number of times the data stored in the cache memory is referenced for the operation processing according to the instructions acquired by the acquisition unit; and
a determination unit configured to determine whether the count value which is incremented by the prefetch unit and is decremented by the fetch unit becomes zero,
wherein the prefetch unit is configured to replace the data in the cache memory and having a count value which is determined to become zero by the determination unit with other data according to instructions acquired by the acquisition unit.

2. The apparatus according to claim 1, wherein the cache memory stores a data array structure including a plurality of entries identified by indices and including, for each entry, data read out from the main memory for performing the operation processing, and wherein the data array structure further includes a tag bit for each entry.

3. The apparatus according to claim 2, wherein
said prefetch unit calculates an index of said cache memory from a received reference address, and when a tag bit of an entry corresponding to the calculated index matches the reference address, increments a count value of the entry by one,
said fetch unit calculates an index of said cache memory from a received reference address, and when a tag bit of an entry corresponding to the calculated index matches the reference address, increments a count value of the entry by one, and
when the tag bit of the entry corresponding to the calculated index does not match the reference address, said prefetch unit inhibits execution of replacement processing until the count value of the entry becomes zero.

4. The apparatus according to claim 2, wherein said cache memory includes at least two of the data array structures.

5. The apparatus according to claim 1, wherein each of the prefetch and fetch units generate a reference address for the data referenced for performing the operation processing according to the instructions acquired by the acquisition unit, and
wherein the prefetch unit increments, in accordance with the reference address, the count value of the data corresponding to the reference address, and
wherein the fetch unit decrements, in accordance with the reference address, the count value of the data corresponding to the reference address.

6. A method of controlling a data processing apparatus including a cache memory including a data array structure including a plurality of entries identified by indices and including, for each entry, data to be cached and a reference count associated with the data, in order to cache some of data in a main memory, wherein the cache memory is capable of data read/write at a higher speed than the main memory, the method comprising:
an acquisition step of acquiring instructions for operation processing;
a prefetch step of performing control to readout data referenced for performing the operation processing according to the instructions acquired by the acquisition step from the main memory and causing the cache memory to store the data in a case where the data referenced for performing the operation processing according to the instructions acquired by the acquisition step and stored in the main memory is not stored in the cache memory, and of incrementing a count which is stored in the cache memory and is related to a number of times the data stored in the cache memory is referenced for the operation processing according to the instructions acquired by the acquisition step in a case where the data referenced for performing the operation processing according to the instructions acquired by the acquisition step and stored in the main memory is stored in the cache memory;
a fetch step of, independently of controlling of the prefetch step, reading out from the main memory the data referenced for the operation processing according to the instructions acquired by the acquisition step, and according to the readout, decrementing the count value which is stored in the cache memory and is related to the number of times the data stored in the cache memory is referenced for the operation processing according to the instructions acquired by the acquisition step; and
a determination step configured to determine whether the count value which is incremented by the prefetch step and is decremented by the fetch step becomes zero,
wherein the prefetch step replaces the data which is in the cache memory and having a count value which is determined to become zero by the determination step with other data according to instructions acquired by the acquisition step.

7. The method according to claim 6, wherein the cache memory stores a data array structure including a plurality of entries identified by indices and including, for each entry, data read out from the main memory for performing the operation processing, and wherein the data array structure further includes a tag bit for each entry.

8. The method according to claim 7, wherein
said prefetch step calculates an index of said cache memory from a received reference address, and when a tag bit of an entry corresponding to the calculated index matches the reference address, increments a count value of the entry by one, said fetch step calculates an index of said cache memory step from a received reference address, and when a tag bit of an entry corresponding to the calculated index matches the reference address, increments a reference count of the entry by one, and when the tag bit of the entry corresponding to the calculated index does not match the reference address, said prefetch unit inhibits execution of replacement processing until the count value of the entry becomes zero.

9. A non-transitory computer-readable storage medium comprising computer-executable instructions for causing a computer to perform:

an acquisition step of acquiring instructions for operation processing;

a cache memory step of storing some of data in a main memory in a cache memory capable of data read/write at a higher speed than the main memory;

a prefetch step of performing control to readout data referenced for performing the operation processing according to the instructions acquired by the acquisition step from the main memory and causing the cache memory to store the data in a case where the data referenced for performing the operation processing according to the instructions acquired by the acquisition step and stored in the main memory is not stored in the cache memory, and of incrementing a count which is stored in the cache memory and is related to a number of times the data stored in the cache memory is referenced for the operation processing according to the instructions acquired by the acquisition step in a case where the data referenced for performing the operation processing according to the instructions acquired by the acquisition step and stored in the main memory is stored in the cache memory;

a fetch step of, independently of controlling of the prefetch step, reading out from the main memory the data referenced for the operation processing according to the instructions acquired by the acquisition step, and according to the readout, decrementing the count value which is stored in the cache memory and is related to the number of times the data stored in the cache memory is referenced for the operation processing according to the instructions acquired by the acquisition step; and a determination step configured to determine whether the count value which is incremented by the prefetch step and is decremented by the fetch step becomes zero, wherein the prefetch step replaces the data which is in the cache memory and having a count value which is determined to become zero by the determination step with other data according to instructions acquired by the acquisition step.

* * * * *